United States Patent
Li et al.

(10) Patent No.: US 10,548,160 B2
(45) Date of Patent: Jan. 28, 2020

(54) INTERFERENCE MITIGATION ON GRANT-BASED AND GRANT-LESS TRAFFIC MULTIPLEXING IN WIRELESS COMMUNICATION

(71) Applicant: QUALCOMM Incorporated, San Diego, CA (US)

(72) Inventors: Chong Li, Weehawken, NJ (US); Junyi Li, Chester, NJ (US); Hao Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 106 days.

(21) Appl. No.: 15/585,993

(22) Filed: May 3, 2017

(65) Prior Publication Data
US 2018/0124813 A1 May 3, 2018

Related U.S. Application Data

(60) Provisional application No. 62/415,238, filed on Oct. 31, 2016.

(51) Int. Cl.
*H04W 72/12* (2009.01)
*H04W 72/04* (2009.01)
*H04W 72/14* (2009.01)

(52) U.S. Cl.
CPC ... *H04W 72/1263* (2013.01); *H04W 72/0446* (2013.01); *H04W 72/121* (2013.01); *H04W 72/1289* (2013.01); *H04W 72/14* (2013.01)

(58) Field of Classification Search
CPC .................. H04W 72/0446; H04W 72/1263
See application file for complete search history.

(56) References Cited

U.S. PATENT DOCUMENTS

| | | | | |
|---|---|---|---|---|
| 8,688,134 B2* | 4/2014 | Lee | .................... | H04W 72/0426 370/331 |
| 2002/0159470 A1* | 10/2002 | Atarashi | .................. | H04J 13/00 370/441 |
| 2004/0223505 A1* | 11/2004 | Kim | ........................ | H04L 47/14 370/412 |
| 2013/0051228 A1* | 2/2013 | Kim | ...................... | H04L 47/115 370/230 |

(Continued)

FOREIGN PATENT DOCUMENTS

| WO | WO-2013178037 A1 | 12/2013 | |
| WO | WO-2016167828 A1 * | 10/2016 | ........ H04W 72/1268 |

OTHER PUBLICATIONS

International Search Report and Written Opinion—PCT/US2017/057701—ISA/EPO—dated Jan. 26, 2018.

*Primary Examiner* — Andrew Lai
*Assistant Examiner* — Sumitra Ganguly
(74) *Attorney, Agent, or Firm* — Loza & Loza, LLP

(57) ABSTRACT

Aspects of the present disclosure provide for various methods and apparatuses for mitigating intra-cell interference when multiplexing grant-less traffic and grant-based traffic. When a wireless device transmits data without first requesting a grant of certain network resources from a base station, such data transmission may be called grant-less traffic in this disclosure. Different from grant-less traffic, when a wireless device needs to request a grant of certain network resources before transmitting data, such data may be called grant-based traffic in this disclosure.

28 Claims, 15 Drawing Sheets

(56) References Cited

U.S. PATENT DOCUMENTS

| | | | |
|---|---|---|---|
| 2013/0084851 A1* | 4/2013 | Li | H04W 24/00 |
| | | | 455/424 |
| 2014/0018120 A1* | 1/2014 | Anbe | H04L 1/20 |
| | | | 455/509 |
| 2015/0230259 A1* | 8/2015 | Park | H04B 7/0626 |
| | | | 370/329 |
| 2015/0333852 A1* | 11/2015 | Yoshizawa | H04W 36/04 |
| | | | 370/252 |
| 2016/0128010 A1* | 5/2016 | McMeekin | H04W 56/0055 |
| | | | 370/350 |

* cited by examiner

INTERFERENCE MITIGATION ON GRANT-BASED AND GRANT-LESS TRAFFIC MULTIPLEXING IN WIRELESS COMMUNICATION

PRIORITY CLAIM

This application claims priority to and the benefit of provisional patent application No. 62/415,238 filed in the United States Patent and Trademark Office on 31 Oct. 2016, the entire content of which is incorporated herein by reference as if fully set forth below in its entirety and for all applicable purposes.

TECHNICAL FIELD

The technology discussed below relates generally to wireless communication systems, and more particularly, to interference mitigation when multiplexing grant-based traffic and grant-less traffic in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, subcarriers, time slots, transmit power, etc.). In a shared resource network, a wireless device may transmit data to the network using a request-grant method (grant-based method) in that the wireless device requests a permission or grant from the network prior to transmitting data, and a network entity (e.g., a base station, Node B, eNode B, gNB, access point, scheduling entity, etc.) decides when and how the wireless device (e.g., user equipment) may transmit its data using allocated network resources (e.g., time and/or frequency resources).

However, the overhead of grant-based transmissions can be undesirably high when the amount of payload data transmitted is relatively small compared to the overhead data. The overhead may be even more significant for certain types or classes of wireless devices that typically transmit limited or small amount of payload data relative to the overhead data. Examples of such wireless devices include Internet of Everything (IoE) devices, Internet of Things (IoT) devices, network connected sensors and monitoring devices, and other small data devices.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide for various methods and apparatuses for mitigating intra-cell interference when multiplexing grant-less traffic and grant-based traffic. When a wireless device transmits data without first requesting a grant of certain network resources from a base station, such data transmission may be called grant-less traffic in this disclosure. Different from grant-less traffic, when a wireless device needs to request a grant of certain network resources before transmitting data, such data may be called grant-based traffic in this disclosure.

One aspect of the present disclosure provides a method of wireless communication operable at a scheduling entity. The scheduling entity communicate with a plurality of user equipments (UEs) utilizing a plurality of slots configured to multiplex grant-based traffic and grant-less traffic. The scheduling entity further determine interference to the grant-based traffic caused by the grant-less traffic. The scheduling entity further transmits control information to the plurality of UEs, to mitigate the interference by statistically controlling a number of the plurality of UEs that transmit grant-less traffic in one or more of the plurality of slots.

Another aspect of the present disclosure provides a method of wireless communication operable at a user equipment (UE). The UE communicates with a scheduling entity utilizing a plurality of slots configured to multiplex grant-based traffic and grant-less traffic. The UE receives control information from the scheduling entity. The UE determines a first probability of transmitting grant-less traffic in one or more of the plurality of slots based on the control information. The UE determines a second probability of transmitting grant-based traffic in one or more of the plurality of slots based on the control information. The UE further transmits grant-less traffic and grant-based traffic based on the first probability and the second probability.

Another aspect of the present disclosure provides a wireless communication apparatus that include a communication interface configured to communicate with a plurality of UEs, a memory, and a processor operatively coupled to the memory and communication interface. The memory and the processor are configured to communicate with the plurality of UEs utilizing a plurality of slots configured to multiplex grant-based traffic and grant-less traffic, determine interference to the grant-based traffic caused by the grant-less traffic; and transmit control information to the plurality of UEs, to mitigate the interference by statistically controlling a number of the plurality of UEs that transmit grant-less traffic in one or more of the plurality of slots.

Another aspect of the present disclosure provides a wireless communication apparatus including a communication interface configured to communicate with a scheduling entity, a memory, and a processor operatively coupled to the memory and communication interface. The memory and the processor are configured to communicate with the scheduling entity utilizing a plurality of slots configured to multiplex grant-based traffic and grant-less traffic, and receive control information from the scheduling entity. The memory and the processor are further configured to determine a first probability of transmitting grant-less traffic in one or more of the plurality of slots based on the control information, determine a second probability of transmitting grant-based traffic in one or more of the plurality of slots based on the control information, and transmit grant-less traffic and grant-based traffic based on the first probability and the second probability.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide for various methods and apparatuses for mitigating intra-cell interference when multiplexing grant-less traffic and grant-based traffic. When a wireless device transmits data without first requesting a grant of certain network resources from a scheduling entity (e.g., a base station), such data transmission may be called grant-less traffic in this disclosure. Different from grant-less traffic, when a wireless device needs to request a grant of certain network resources before transmitting data, such data may be called grant-based traffic in this disclosure. In some examples, the network scheduling entity may broadcast or transmit a grant without an express request from the wireless device.

In some aspects of the disclosure, a network may support both grant-less traffic and grant-based traffic by multiplexing, for example, time division multiplexing (TDM) and frequency division multiplexing (FDM). While multiplexing can reduce the interference between grant-less traffic and grant-based traffic, interference can be further mitigated by using the techniques, processes, and methods described herein according to some aspects of the disclosure.

This disclosure is particularly applicable to certain types of small data wireless devices that typically transmit limited amount of payload data relative to communication overhead. Examples of such small data wireless devices include Internet of Everything (IoE) devices, Internet of Things (IoT) devices, network connected sensors and monitoring devices, and/or other small data devices in general. However, aspects of the present disclosure may be applied to any wireless devices, not limited to small data devices.

Figure 1:
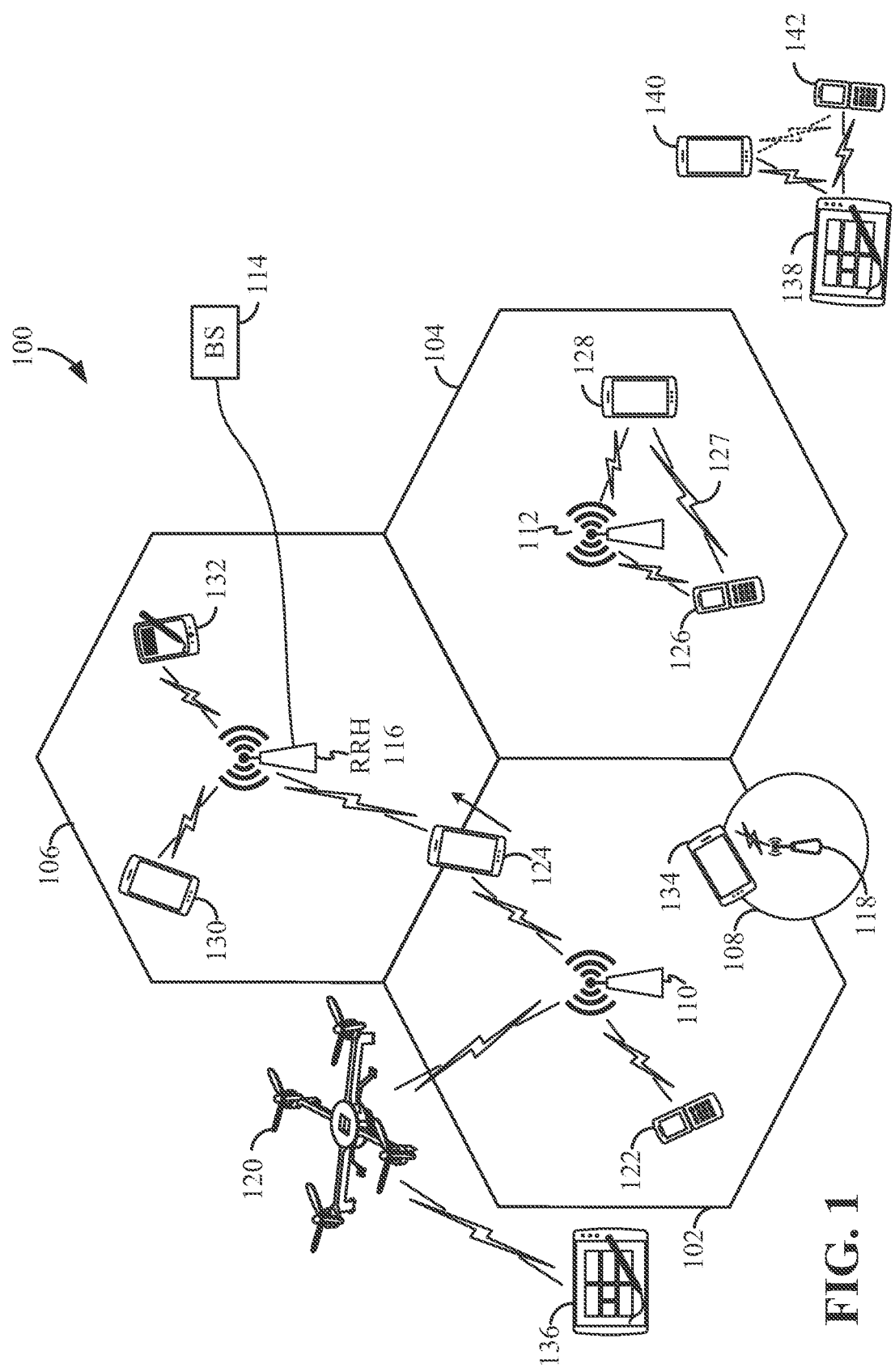
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, gNB, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. The UE may communicate with the base station using grant-less and/or grant-based communication. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in slots using grant-less data traffic and/or grant-based data traffic.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes. In some aspects of the disclosure, grant-less data traffic and grant-based data traffic may be multiplexed using any of the above multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. Different carriers may be allocated to grant-less traffic and grant-based traffic, respectively. In TDD, transmissions in different directions on a given channel are separated from one another using time division multiplexing. That is, at some slots the channel is dedicated for transmissions in one direction, while at other slots the channel is dedicated for transmissions in the other direction, where the direction may change very rapidly, e.g., every slot. A slot may be allocated for grant-less traffic or grant-based traffic.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station or gNB) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity. In some examples, the scheduled communication may be called grant-based traffic or data transmission.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
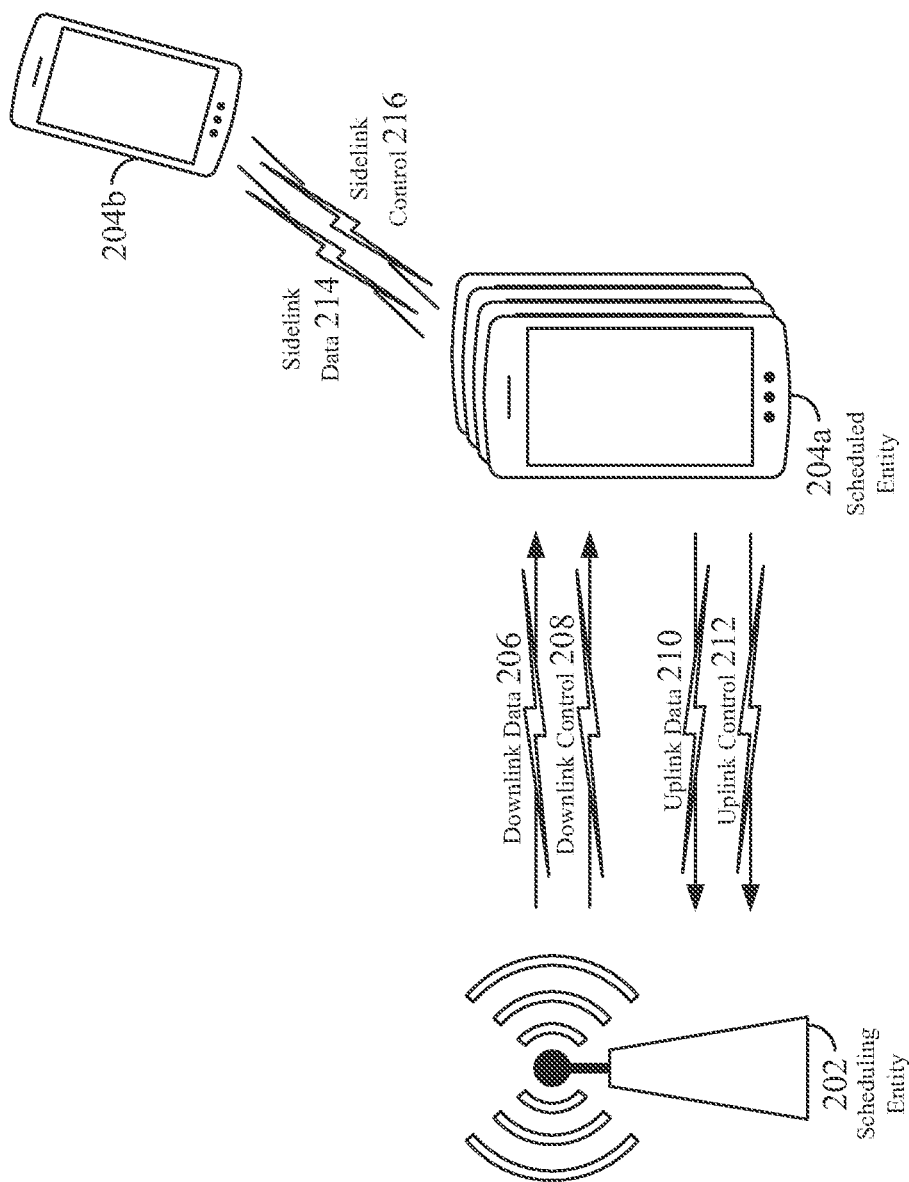
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast or transmit data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The control information 208 may include grants for grant-based access. In some examples, the control information 208 may control the multiplexing of grant-less traffic and grant-based traffic using different slots and/or frequencies. Therefore, grant-less traffic and grant-based traffic may be multiplexed in time and/or frequency domains. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and data information may be organized by subdividing a carrier, in time, into suitable transmission time intervals (TTIs). The scheduled entities 204 may transmit uplink data as grant-less traffic or grant-based traffic according to the control information 208.

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink data information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
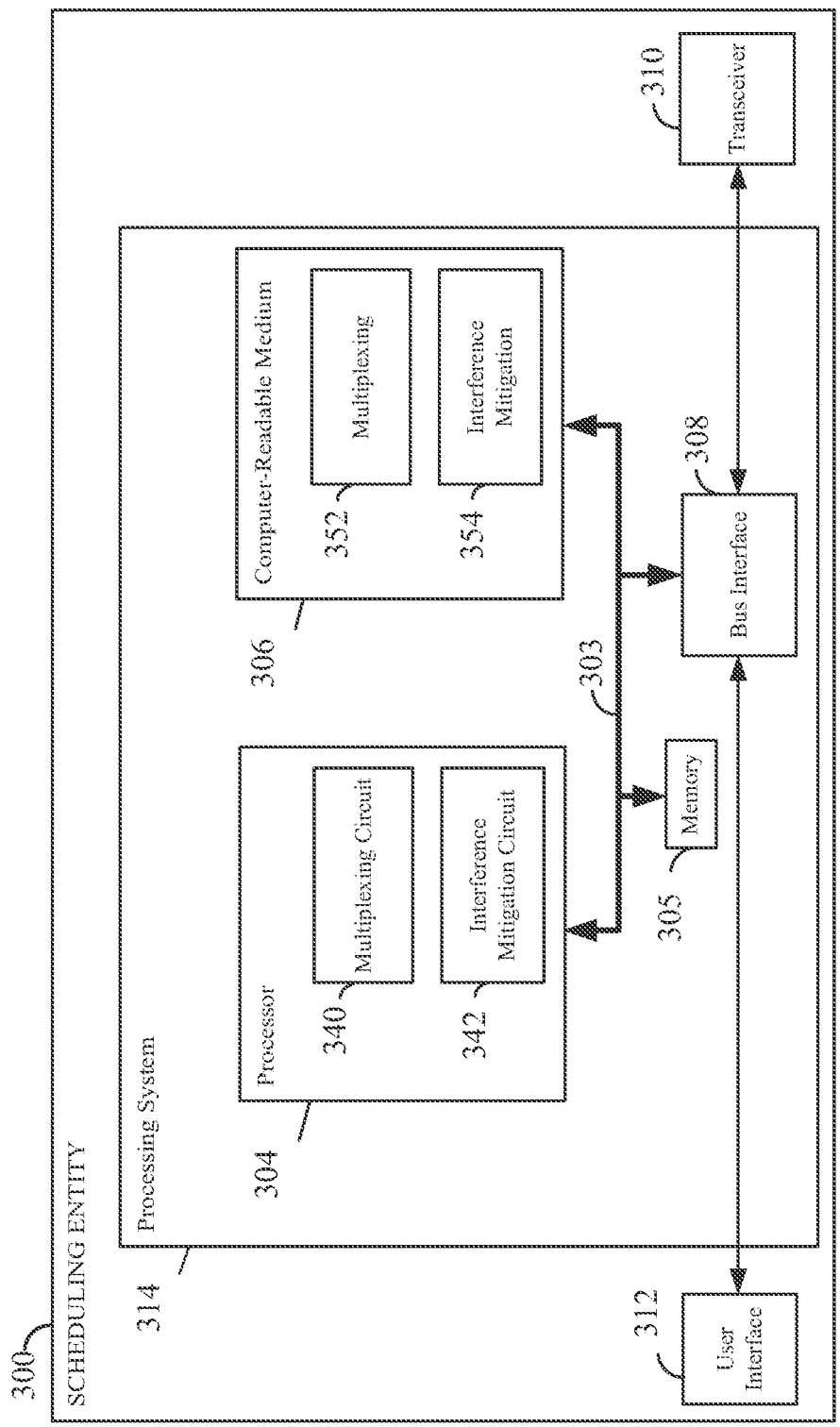
FIG. 3 is a block diagram illustrating an example of a hardware implementation for a scheduling entity employing a processing system according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1, 2, and/or 11. In another example, the scheduling entity 300 may be a base station as illustrated in any one or more of FIGS. 1, 2, and/or 11.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions and processes described herein. That is, the processor 304, as utilized in a scheduling entity 300, may be used to implement any one or more of the processes and procedures described below and illustrated in FIGS. 5-13.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include multiplexing circuitry 340 configured to perform various functions for multiplexing grant-less traffic and grant-based traffic. For example, the multiplexing circuitry 340 may be configured to implement one or more of the multiplexing functions described below in relation to FIGS. 5-13. In some aspects of the disclosure, the processor 340 may include interference mitigation circuitry 344 configured to perform various interference mitigation functions described below in relation to FIGS. 5-13.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include multiplexing software 352 configured to perform various grant-less traffic and grant-based traffic multiplexing functions described below in relation to FIGS. 5-13. In one or more examples, the computer-readable storage medium 306 may include interference mitigation software 354 configured to perform various interference mitigation functions described below in relation to FIGS. 5-13.

Figure 4:
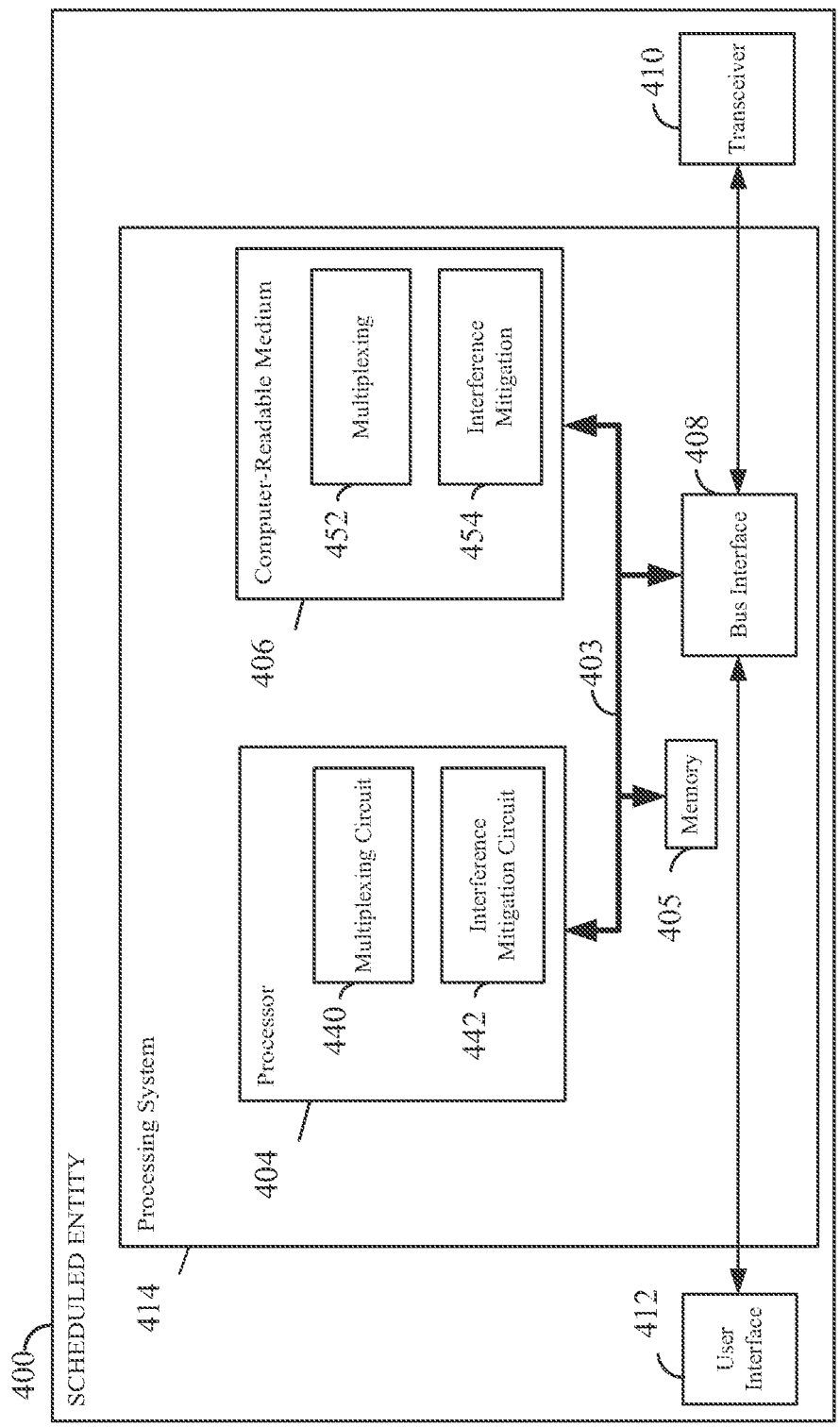
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, and/or 11.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes and procedures described below and illustrated in FIGS. 5-13.

In some aspects of the disclosure, the processor 404 may include multiplexing circuitry 440 configured to perform various grant-less traffic and grant-based traffic multiplexing functions and procedures described below in relation to FIGS. 5-13. In some aspects of the disclosure, the processor 404 may include interference mitigation circuitry 442 configured to perform various grant-less traffic and grant-based traffic interference mitigation functions and procedures described below in relation to FIGS. 5-13.

In one or more examples, the computer-readable storage medium 406 may include multiplexing software 452 configured to perform various grant-less traffic and grant-based traffic multiplexing functions described below in relation to FIGS. 5-13. In one or more examples, the computer-readable storage medium 406 may include interference mitigation software 454 configured to perform various interference mitigation functions described below in relation to FIGS. 5-13.

Figure 5:
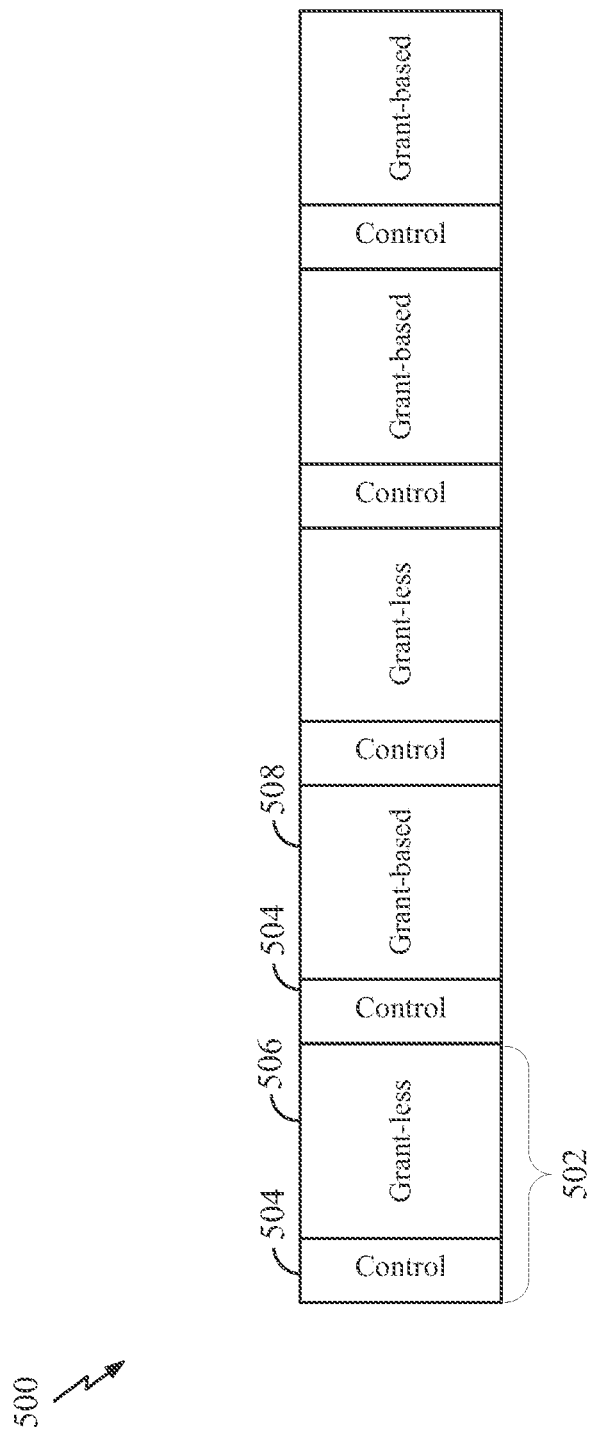
FIG. 5 is a diagram illustrating a time division multiplexing (TDM) scheme of grant-based traffic and grant-less traffic according to some aspects of the disclosure.

FIG. 5 is a diagram illustrating a time division multiplexing (TDM) scheme 500 of grant-based traffic and grant-less traffic according to some aspects of the disclosure. This TDM scheme 500 may be utilized by any scheduling entity illustrated in FIGS. 1, 2, 3, and/or 11 to multiplex grant-based traffic and grant-less traffic. Referring to FIG. 5, in a slot 502, a downlink control channel 504 (e.g., a broadcast PDCCH or an indication channel) may provide control information (grant-less access reservation) that indicates whether a certain slot is reserved for grant-less traffic 506 or grant-based traffic 508. For example, the control information may include one or more bits that indicate whether one or more slots may be used for grant-based traffic and/or grant-less traffic. Therefore, a scheduled entity (e.g., UE) can decode the control information to determine whether a specific slot can be used for grant-less traffic and/or grant-based traffic. Grant-less traffic or grant-based traffic may be transmitted in an uplink channel, for example, a PUSCH or the like. If a slot is reserved for grant-less traffic, a scheduled entity (e.g., UE) may transmit grant-less data without requesting an UL grant from the scheduling entity.

While FIG. 5 illustrates an exemplary multiplexing pattern of grant-less traffic and grant-based traffic, other TDM patterns may be used. In one example, multiple consecutive slots may be used for grant-less traffic or grant-based traffic before switching to the other access type. In another example, grant-less traffic slot and grant-based traffic slot may be interleaved according to a predetermined pattern. In some examples, more slots may be allocated for grant-less traffic among a plurality of slots. In some examples, more slots may be allocated for grant-based traffic among a plurality of slots. In some examples, the ratio between grant-less traffic slots and grant-based traffic slots may by dynamically changed in different time periods, for example, based on the needs of the network.

Figure 6:
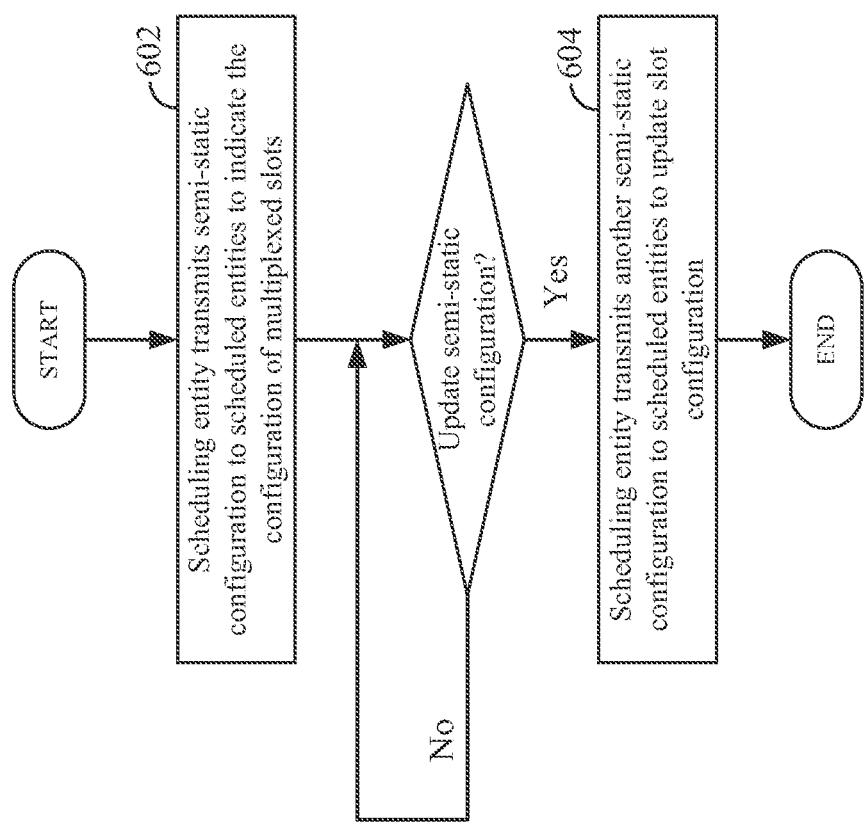
FIG. 6 is a diagram illustrating a procedure for utilizing semi-static configuration to control multiplexing of grant-based traffic and grant-less traffic according to some aspects of the disclosure.

In some examples, the grant-less access reservation may be semi-static. Referring to FIG. 6, at block 602, the scheduling entity may send semi-static configuration to the scheduled entities to indicate the configuration of the multiplexed slots. In some examples, the semi-static configuration may be fixed or maintained for a predetermined time period (e.g., one or more slots) and may be updated on a predetermined schedule or based on a trigger event. At block 604, the scheduling entity may transmit another or updated semi-static configuration to the scheduled entities to change or update slot configuration for multiplexing grant-based traffic and grant-less traffic. Therefore, the scheduled entities do not need to continuously monitor, for example in each slot, for the control information that might change the configuration. In some examples, semi-static configuration may be communicated using radio resource control (RRC) messages, SIBs, or other upper protocol messages. Based on the semi-static configuration, the scheduled entity knows which slot is reserved for grant-less traffic. Therefore, a scheduled entity may transmit grant-less data without checking a dynamic indication (e.g., in the PDCCH) in each slot.

Figure 7:
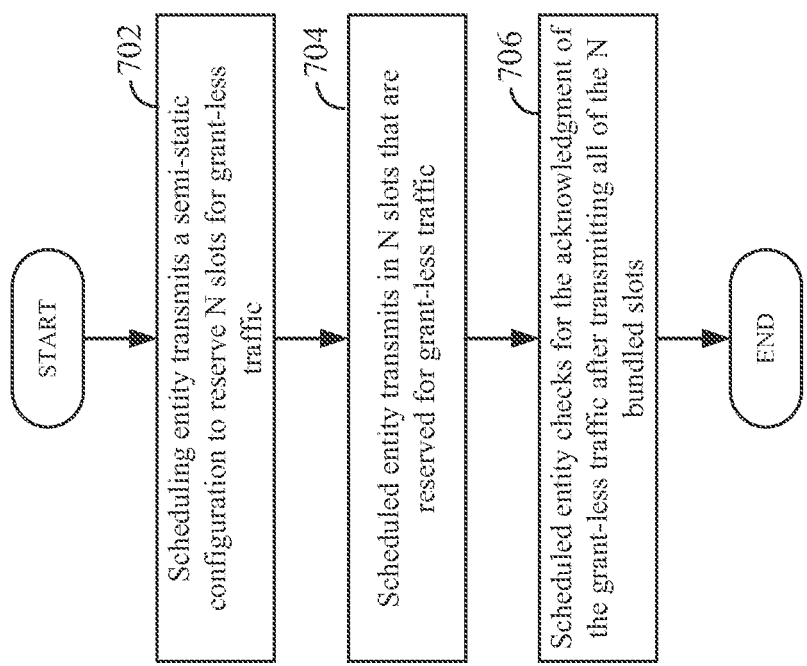
FIG. 7 is a diagram illustrating a procedure for utilizing semi-static configuration to reserve multiple slots for grant-less traffic according to some aspects of the disclosure.

In some aspects of the disclosure, a scheduled entity may bundle a number of grant-less slots for meeting a link budget for the desired power level of the transmission and cell coverage. Referring to FIG. 7, at block 702, a scheduling entity may transmit a semi-static configuration to reserve N slots (N is a positive integer) for grant-less traffic. The scheduling entity may utilize a process similar to the process described in FIG. 6 to transmit a semi-static configuration. The reserved slots for grant-less data may or may not be contiguous in time. In the reserved slots, the scheduled entity can transmit grant-less data without receiving a grant or checking for the dynamic indication in each slot. At block 704, the scheduled entity may transmit grant-less data in N slots that are reserved for grant-less traffic based on the semi-static configuration. At block 706, the scheduled entity checks for the acknowledgment of the grant-less data after transmitting all of the N bundled slots. In some examples, bundling the slots may improve signal coverage and turn-around time.

In some aspects of the disclosure, both dynamic indication and semi-static configuration may be used together. In this case, the semi-static configuration may provide the default multiplexing pattern, and the dynamic indication may be used to adjust or override the multiplexing pattern in certain scenarios or slots. In this case, grant-less access reservation is subject to dynamic reconfiguration.

Figure 8:
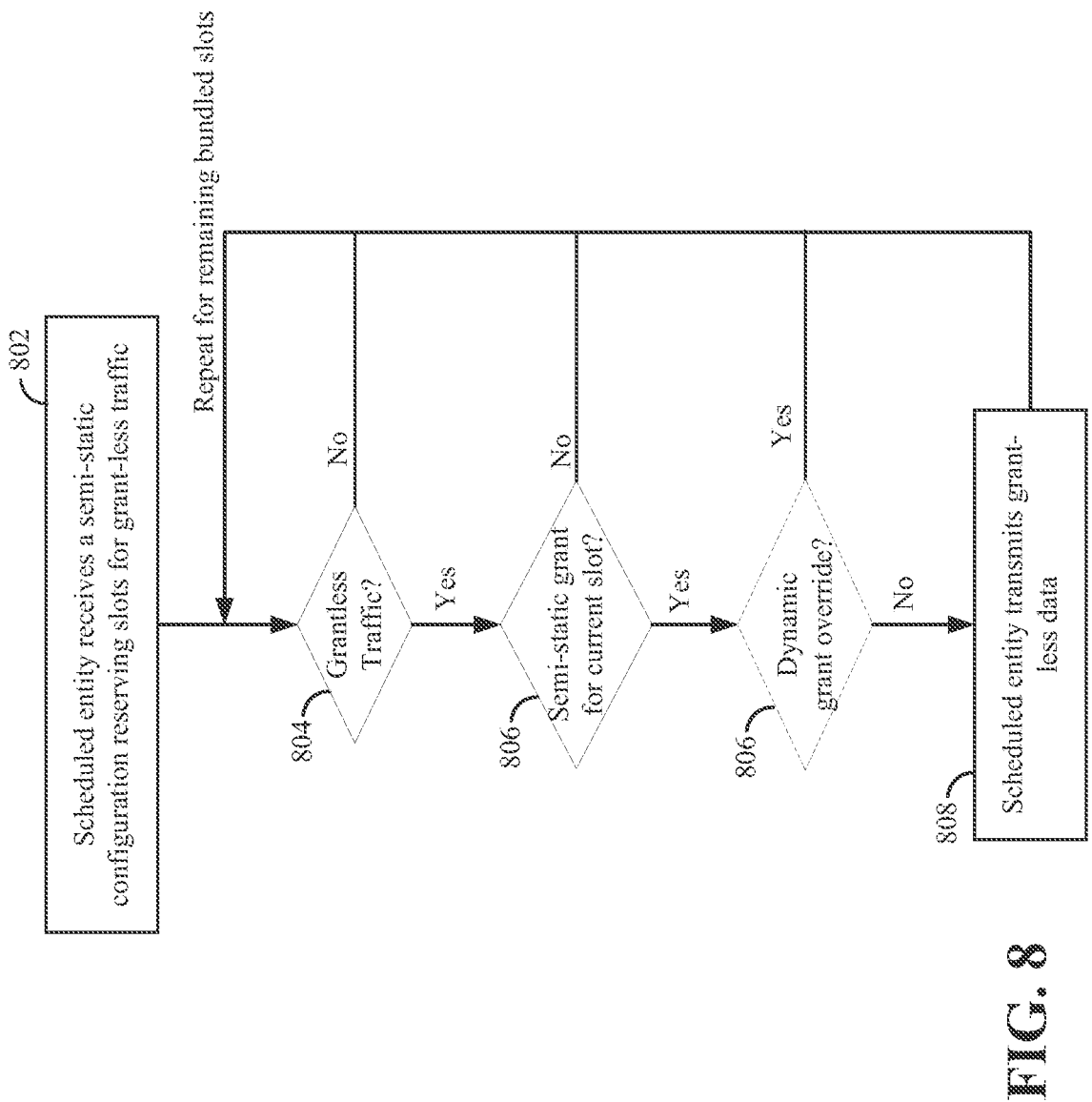
FIG. 8 is a diagram illustrating a procedure for utilizing semi-static configuration and dynamic indication to reserve slots for grant-less traffic according to some aspects of the disclosure.

FIG. 8 is a diagram illustrating a process for using a semi-static configuration for grant-less data with dynamic indication override according to some aspects of the disclosure. In some examples, this process may be performed by the scheduled entity at block 704 of FIG. 7. Referring to FIG. 8, at block 802, a scheduled entity may receive a semi-static configuration that reserves predetermined number of slots (e.g., N slots) for grant-less traffic. In these slots, the scheduled entity may transmit grant-less data without receiving a grant from the network.

At decision block 804, the scheduled entity determines whether it has grant-less data for transmission. If the scheduled entity has no grant-less data for transmission in the current slot, the scheduled entity may check again in the next slot; otherwise, the process may proceed to decision block 806. If it has been determined that the scheduled entity has grant-less data for transmission, at decision block 806, the scheduled entity determines whether the current slot may be used for grant-less traffic according to the semi-static configuration received in block 802. If it is determined that the current slot is configured for grant-less traffic, the process may proceed to block 808; otherwise, the process may repeat from block 804 for the next slot. At block 808, the scheduled entity may transmit grant-less data. If the scheduled entity bundled multiple slots (e.g., N slots) for grant-less traffic, the process may repeat from block 804 for the remaining bundled slots until all of them are transmitted.

In some aspects of the disclosure, the scheduling entity may transmit a dynamic indication to reconfigure a slot reserved for grant-less traffic or grant-based traffic, for example, by semi-static configuration. In one example, the scheduled entity with grant-less operation or data will know the duration and/or bundling of its grant-less traffic, and therefore may check the dynamic indication at block 806 to determine whether a slot can be used to transmit grant-less data and count down from its total grant-less traffic transmission duration and/or bundling. Therefore, if a slot reserved for grant-less traffic is not overridden by the dynamic indication, the scheduled entity may use the slot for grant-less traffic.

In one aspect of the disclosure, the scheduling entity may transmit a dynamic indication in a DL control channel, for example, a common search space PDCCH channel that carries information on whether a slot is available for UL grant-less traffic. In another aspect of the disclosure, the scheduling entity may transmit the dynamic indication in a new indication channel (e.g. similar to PCFICH) in which some tones are assigned to indicate whether a slot is available for UL grant-less traffic.

Figure 9:
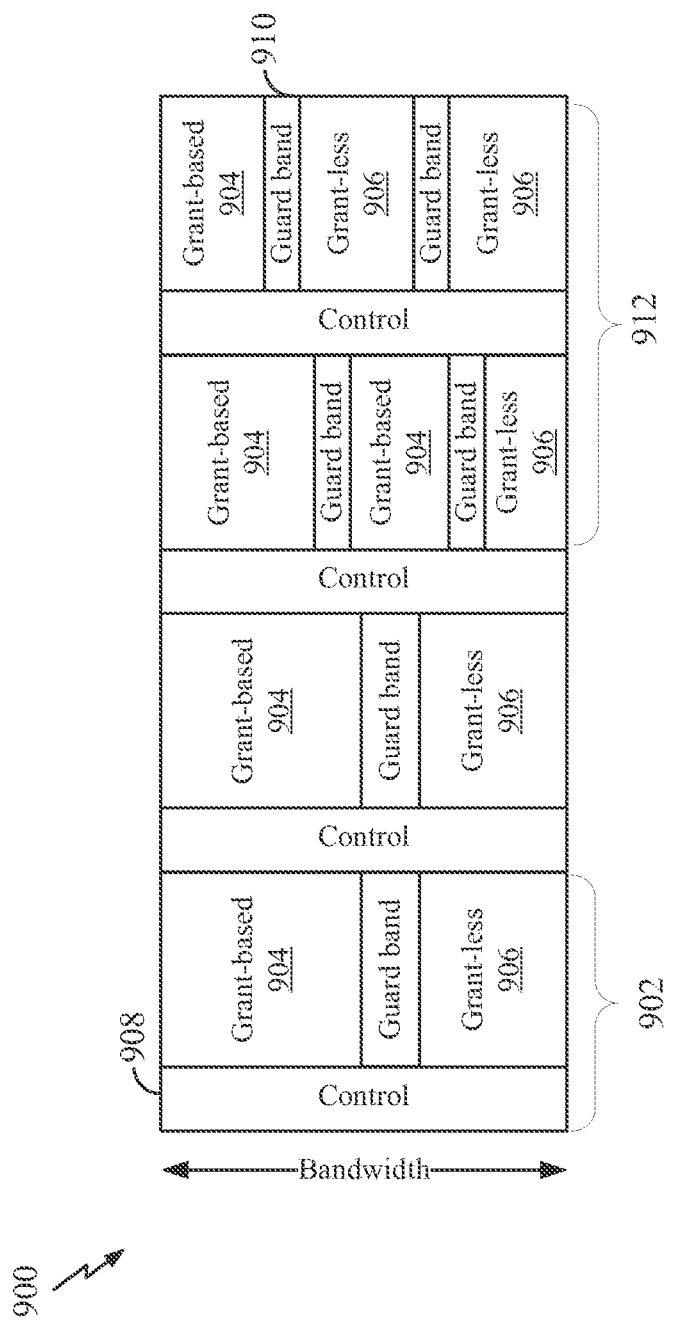
FIG. 9 is a diagram illustrating a frequency division multiplexing (FDM) scheme of grant-based traffic and grant-less traffic according to some aspects of the disclosure.

FIG. 9 is a diagram illustrating a frequency division multiplexing (FDM) scheme 900 of grant-based traffic and grant-less traffic according to some aspects of the disclosure. Referring to FIG. 9, in a slot 902, some bands (or channels, carriers, frequencies) may be allocated to grant-based traffic 904, while some other bands may be allocated for grant-less traffic 906. A control channel 908 may provide control information that indicates the bands for grant-less traffic and grant-based traffic, respectively. In some examples, the control channel may be a PDCCH, PCFICH, or an indicator channel. In some examples, the bands allocated to grant-less traffic and/or grant-based traffic may be continuous or divided into two or more discontinuous bands. In some examples, the grant-less band and grant-based band may be separated by a guard band 910 to mitigate intra-band interference between different bands.

If a slot has a band allocated or reserved for grant-less traffic, a scheduled entity may transmit grant-less data without requesting an UL grant from the scheduling entity in that slot using the grant-less band. While FIG. 9 illustrates an exemplary multiplexing pattern of grant-less and grant-based bands, other FDM patterns may be used. In some examples, the band allocation may be different in different slots 912.

The band allocation of the FDM scheme 900 may be semi-static and/or dynamic. In one aspect of the disclosure, the scheduling entity may transmit a dynamic indication in a DL control channel, for example, a common search space PDCCH channel that carries information on which band is available for grant-less traffic in a predetermined slot. In another aspect of the disclosure, the scheduling entity may transmit the dynamic indication in a new indication channel (e.g., a PCFICH) in which some tones are assigned to indicate whether a band is available for grant-less traffic.

In a wireless network, uplink orthogonality may be maintained (controlled by a scheduling entity like an eNB or gNB) by ensuring that the transmission from different scheduled entities (e.g., UEs) in a cell are time-aligned at the receiver of the scheduling entity. This can prevent intra-cell interference from occurring, between UEs assigned to transmit in consecutive slots and between UEs transmitting on adjacent subcarriers. However, grant-less multi-user access cannot be controlled to achieve time-alignment at a scheduling entity. If a large number of grant-less UEs or scheduled entities start transmitting at different time in the same slot, the interference to the adjacent grant-based traffic could be significant even when the above-described TDM and FDM schemes are used.

Figure 10:
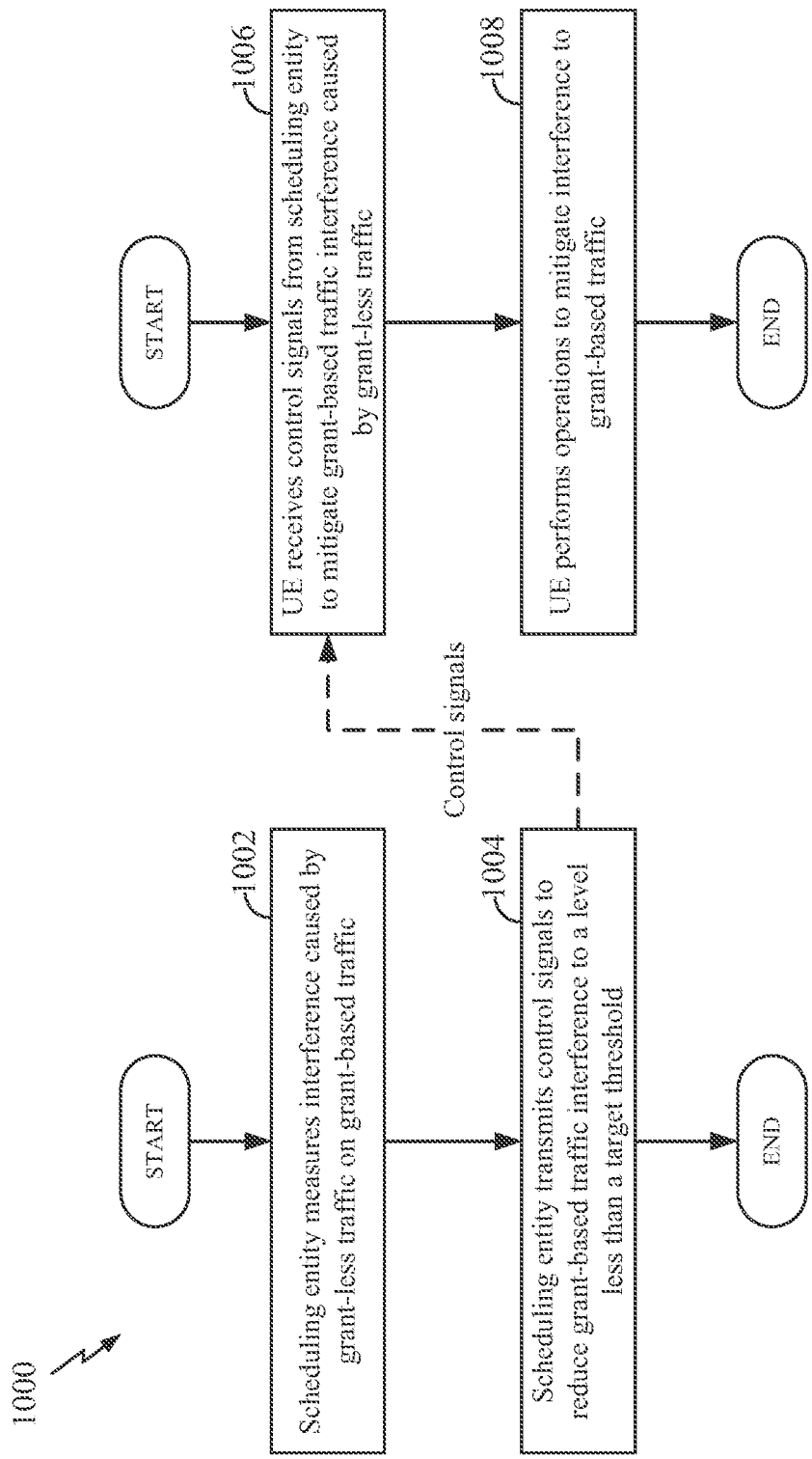
FIG. 10 is a flow chart illustrating procedures for mitigating interference to grant-based traffic caused by grant-less traffic according to some aspects of the disclosure.
Figure 11:
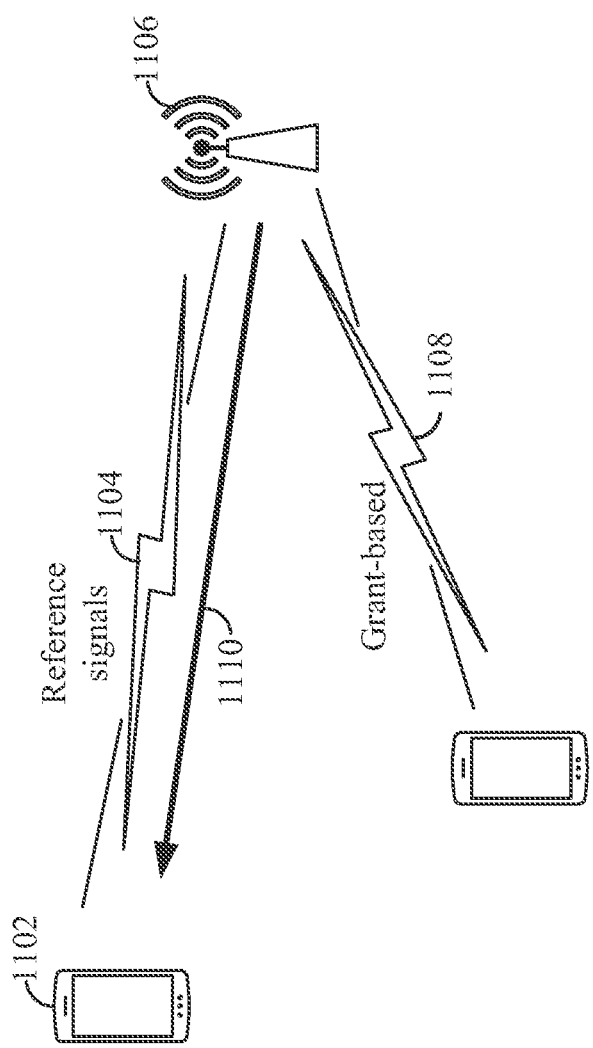
FIG. 11 is a diagram illustrating a process for determining interference to grant-based traffic using reference signals allocated in grant-based resources.

According to some aspects of the disclosure, a scheduling entity can transmit or broadcast a control signal to grant-less scheduled entities to impose power control and/or grant-less traffic loading control in order to mitigate interference to grant-based traffic to a level below a target threshold. FIG. 10 is a flow chart illustrating various procedures 1000 for mitigating interference to grant-based traffic caused by grant-less traffic in accordance with some aspects of the disclosure. As described below, some or all illustrated features may be omitted in a particular implementation within the scope of the present disclosure, and some illustrated features may not be required for implementation of all embodiments. In some examples, some or all of the procedures 1000 may be carried out by the scheduling entity 300 illustrated in FIG. 3 and/or scheduled entity 400 illustrated in FIG. 4. In some examples, the procedures 1000 may be carried out by any suitable apparatus or means for carrying out the functions or algorithm described below.

At block 1002, a scheduling entity 300 measures interference to grant-based traffic caused by grant-less traffic. For example, the scheduling entity 300 may be a base station (e.g., eNB, gNB) that is configured to multiplex grant-less traffic and grant-based traffic from a plurality of scheduled entities (e.g., UEs). The grant-less traffic and grant-based traffic may be multiplexed using TDM and/or FDM as described in relation to FIGS. 5 and 9.

The scheduling entity may estimate the interference by using reference signals allocated in the grant-based resources. For example, referring to FIG. 11, grant-based scheduled entities 1102 may transmit certain known uplink reference signals 1104, and the scheduling entity 1106 may determine the interference to grant-based traffic 1108 by measuring the power level or signal quality of the received reference signals. The worse the power level and/or signal quality of the reference signals, the worse is the interference of the grant-based traffic. In some examples, the scheduling entity may measure the reference signals in each slot or predetermined slots.

At block 1004, the scheduling entity transmits or broadcasts control signals or control information that can reduce grant-based traffic interference to a level less than a target or predetermined threshold. For example, the threshold may be determined such that when the interference is less than the threshold, the signal quality or power of the received reference signals is greater than a predetermined level or threshold. At block 1006, the scheduled entity may receive control signals 1110 (see FIG. 11) from the scheduling entity to mitigate grant-based traffic interference caused by grant-less traffic. At block 1008, the scheduled entity that transmits grant-less traffic performs certain operations to mitigate interference to grant-based traffic.

Figure 12:
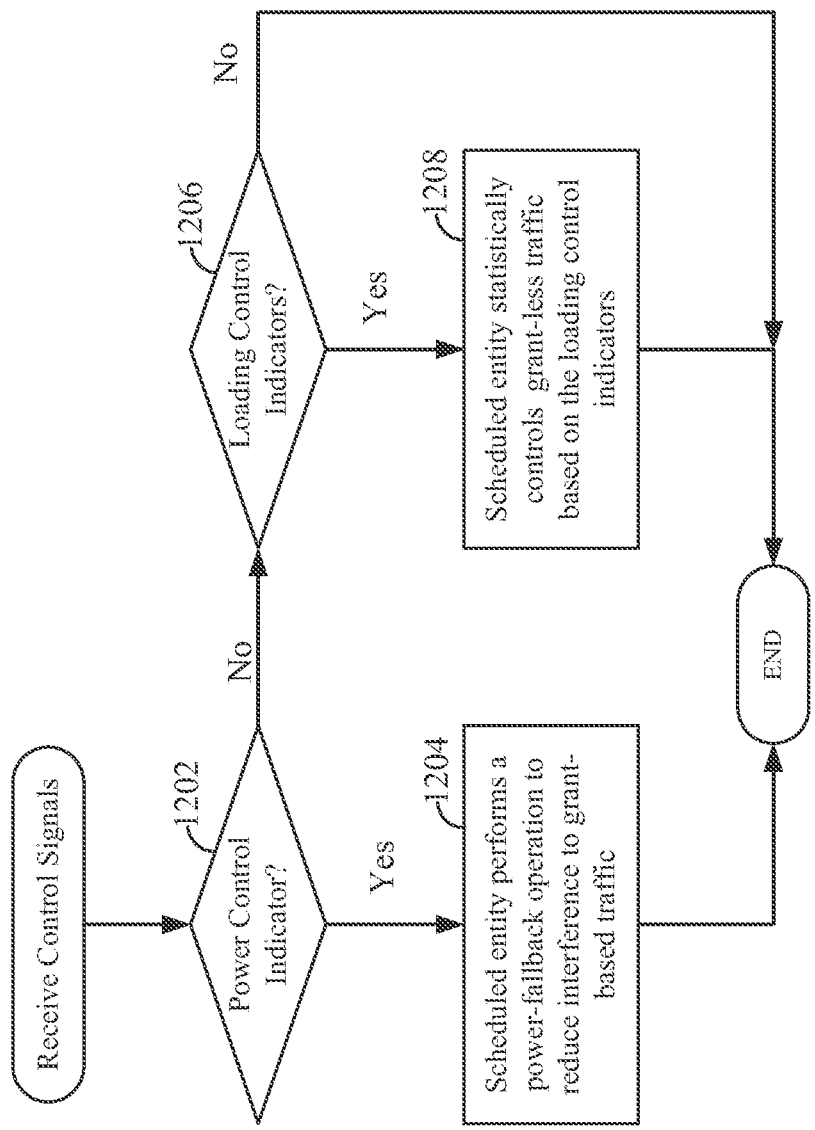
FIG. 12 is a diagram illustrating exemplary operations performed by a scheduled entity to mitigate interference to grant-based traffic according to some aspects of the disclosure.

FIG. 12 is a diagram illustrating exemplary operations performed by a scheduled entity to mitigate interference to grant-based traffic according to some aspects of the disclosure. It is assumed that a scheduled entity received control signals from a scheduling entity. At block 1202, the scheduled entity may determine that the control signals include a power control indicator. In response to the power control indicator, at block 1204, the scheduled entity may perform a power-fallback operation to reduce interference to grant-based traffic. During the power-fallback operation, the scheduled entity may reduce the transmit power of its grant-less traffic by a predetermined power fallback level. The power control indicator can be configured to indicate various transmit power fallback levels. The fallback level may be determined based on the interference measurement. For example, the indicator may indicate a higher level of power fallback level for higher interference measurement. To the contrary, the indicator may indicate a lower level of power fallback level for lower interference measurement.

At block 1206, the scheduled entity may determine that the control signals include loading control indicators that statistically controls the number of scheduled entities that can transmit grant-less traffic in the same slot. In response, at block 1208, the scheduling entity statistically controls grant-less traffic based on the loading control indicators.

In one example, the loading control indicators may include a first indicator $\alpha$ used for controlling grant-less traffic from on-going scheduled entities and a second indicator $\beta$ used for controlling grant-less traffic from initial-access scheduled entities. The on-going scheduled entity is one that is currently transmitting grant-less traffic. The initial-access scheduled entity is one that has grant-less traffic ready or pending to be transmitted, but it is not currently transmitting grant-less traffic. For example, a scheduled entity that is not transmitting grant-less traffic may load data into a buffer for grant-less transmission and looks for an available slot or opportunity to start grant-less traffic transmission. A scheduled entity at this stage may be referred to as the initial-access scheduled entity. Once the scheduled entity started transmitting grant-less traffic in one or more slots, the scheduled entity may be referred to as the on-going scheduled entities.

The loading control indicators $\alpha$ and $\beta$ can be quantized to map loadings to different levels. For example, both indicators $\alpha$ and $\beta$ may have a value from 0 to 1. A value of 0 indicates that the corresponding scheduled entity stops transmitting grant-less traffic, and a value of 1 indicates that the corresponding scheduled entity transmits grant-less traffic. Any other value between 0 and 1 statistically indicates the probability that a scheduled entity among a plurality of scheduled entities may transmit grant-less traffic. A scheduled entity may utilize both or either of the above-described power fallback method and/or statistical control method to mitigate interference to grant-based traffic.

Figure 13:
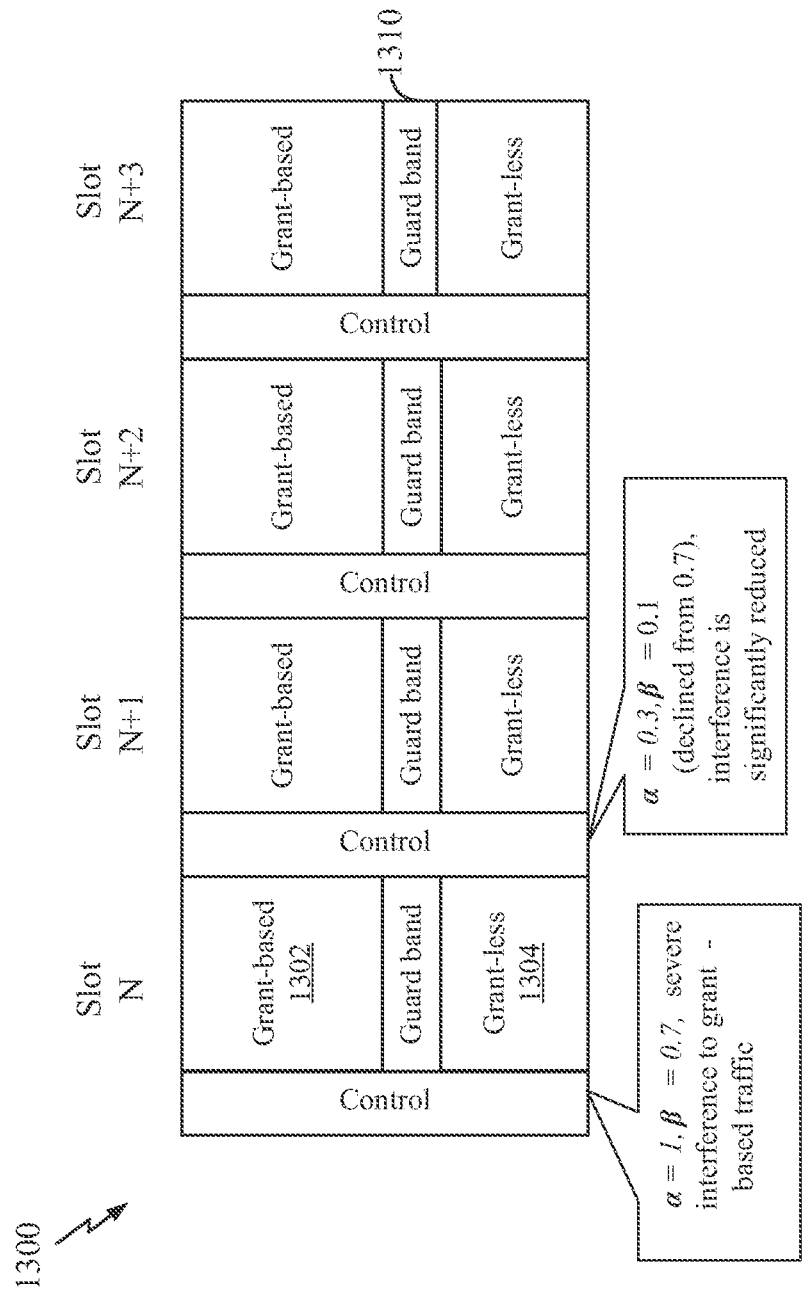
FIG. 13 is a diagram illustrating exemplary grant-less traffic loading control schemes according to some aspects of the present disclosure.

FIG. 13 is a diagram illustrating examples of grant-less traffic loading control using the above-described loading control indicators $\alpha$ and $\beta$ in accordance with some aspects of the present disclosure. In a first slot N, the scheduling entity may determine that interference to grant-based traffic 1302 is greater than a predetermined level or threshold. In this case, the scheduling entity may broadcast the indicators $\alpha$ and $\beta$ with predetermined values to reduce the interference to grant-based traffic caused by grant-less traffic 1304. In one example, the indicators may have the values $\alpha=1$ and $\beta=0.7$. Therefore, in average or statistically all on-going scheduled entities continue their grant-less transmission (i.e., $\alpha=1$), and in average or statistically 70% of the grant-less (initial-access) scheduled entities that have pending data to transmit can get access and start to transmit grant-less traffic (i.e., $\beta=0.7$) using the bands reserved for grant-less traffic.

Based on the value of the indicators $\alpha$ and $\beta$, each scheduled entity may generate a random number or a pseudo-random number that determines the probability that a particular on-going scheduled entity can continue to transmit grant-less traffic or an initial-access scheduled entity can gain access to transmit pending grant-less traffic. For example, a scheduled entity may utilize a random number generator implemented in hardware and/or software to generate the random number. While the scheduled entities may generate random numbers that indicate various probabilities (e.g., higher, equal to, and lower than the indicator) of transmitting grant-less data, the average of the random numbers among the scheduled entities will be substantially equal to the indicator $\alpha$ or $\beta$. In one example, assuming $\beta=0.7$, a UE may generate a random number uniformly between 0 and 1, inclusive. If the number is less than or equal to 0.7, this UE can get access to the channel to transmit grant-less data. Similar procedure may be used for the a indicator.

Referring to FIG. 13, in a slot N+1, the scheduling entity may determine that interference to grant-based traffic is getting worse. Therefore, the scheduling entity may set the values of the indicators $\alpha$ and $\beta$ to further reduce grant-less traffic. For example, the indicators may be set as $\alpha=0.3$ and $\beta=0.1$. In this case, in average only 30% of the on-going grant-less scheduled entities can continue to transmit grant-less traffic, and in average 10% of initial-access scheduled entities can get access to transmit grant-less traffic. Using the above described grant-less traffic loading control scheme of FIG. 13, a scheduling entity can reduce interference caused by grant-less traffic to a level less than a predetermined threshold.

Figure 14:
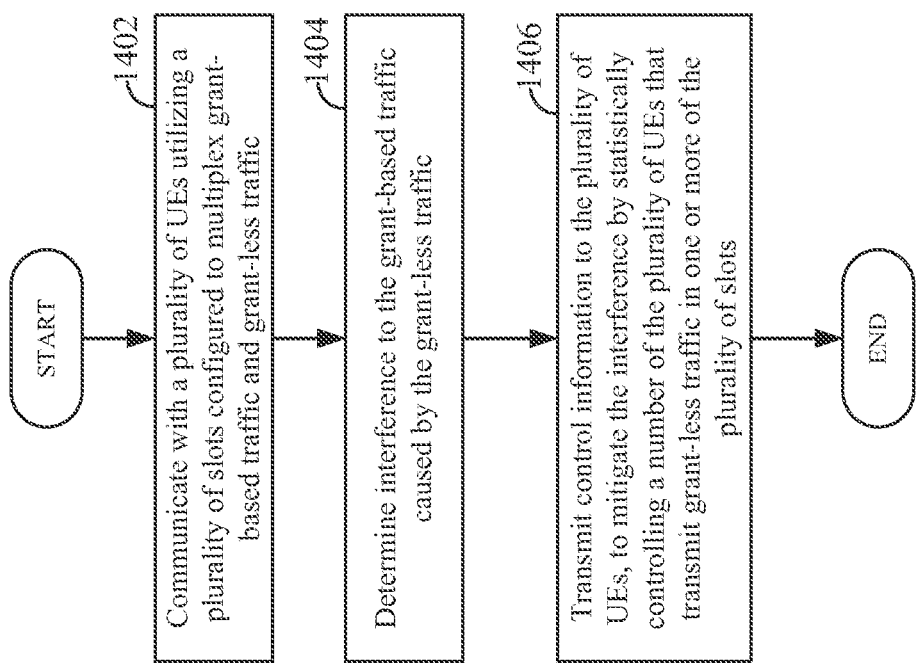
FIG. 14 is a flow chart illustrating a method for mitigating interference between grant-based traffic and grant-less traffic in accordance with some aspects of the disclosure.

FIG. 14 is a flow chart illustrating a method 1400 for mitigating interference between grant-based traffic and grant-less traffic in accordance with some aspects of the disclosure. This method may be performed using any of the scheduling entities and scheduled entities illustrated in FIGS. 1-5 and/or 11, or any apparatus. At block 1402, a scheduling entity 300 may utilize a multiplexing circuit 340 and a transceiver 310 to communicate with a plurality of UEs utilizing a plurality of slots configured to multiplex grant-based traffic and grant-less traffic. In some examples, grant-based traffic and grant-less traffic may be multiplexed using TDM and/or FDM as described in relation to FIGS. 5, 9, and/or 13. At block 1404, the scheduling entity may utilize an interference mitigation circuit 342 to determine interference to the grant-based traffic caused by the grant-less traffic. For example, the scheduling entity may determine the interference by measuring reference signals 1104 carried in the grant-based traffic as described in relation to FIG. 11. At block 1406, the scheduling entity may utilize the interference mitigation circuit 342 and the transceiver 310 to transmit control information to the UEs to mitigate the interference by statistically controlling a number of the UEs that transmit grant-less traffic in one or more of the plurality of slots. For example, the control information may include the loading control indicators $\alpha$ and $\beta$ as described above in relation to FIG. 13. Therefore, the number of UEs that can transmit grant-less traffic or gain grant-less access can be controlled based on probabilities determined based on the loading control indicators.

Figure 15:
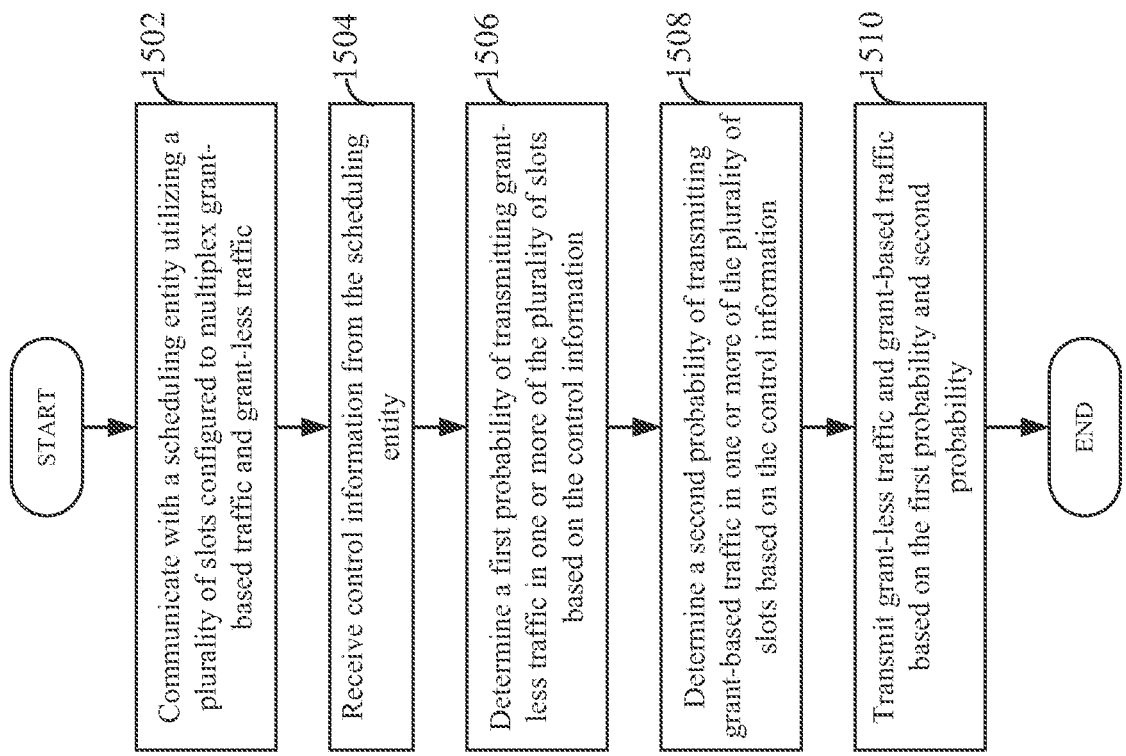
FIG. 15 is a flow chart illustrating another method for mitigating interference between grant-based traffic and grant-less traffic in accordance with some aspects of the disclosure.

FIG. 15 is a flow chart illustrating a method 1500 for mitigating interference between grant-based traffic and grant-less traffic in accordance with some aspects of the disclosure. This method may be performed using any of the scheduling entities and scheduled entities illustrated in FIGS. 1-5 and/or 11, or any apparatus. At block 1502, a scheduled entity 400 (e.g., UE) may utilize a multiplexing circuit 440 and a transceiver 410 to communicate with a scheduling entity 300 utilizing a plurality of slots configured to multiplex grant-based traffic and grant-less traffic. In some examples, grant-based traffic and grant-less traffic may be multiplexed using TDM and/or FDM as described in relation to FIGS. 5, 9, and/or 13.

At block 1504, the scheduled entity may utilize the transceiver 410 to receive control information from the scheduling entity. The control information may include the loading control indicators $\alpha$ and $\beta$ as described above in relation to FIG. 13. In some examples, the control information may be the broadcasted by the scheduling entity in a downlink control channel of a slot. In some examples, the control information may be transmitted in a semi-static configuration (e.g., RRC messages) as described above.

At block 1506, the scheduled entity determines a first probability of transmitting grant-less traffic in one or more of the plurality of slots based on the control information. At block 1508, the scheduled entity determines a second probability of transmitting grant-based traffic in one or more of the plurality of slots based on the control information. The scheduled entity may utilize the interference mitigation circuit 442 to determine the first probability and second probability based on the control information (e.g., loading control indicators $\alpha$ and $\beta$).

At block 1510, the scheduled entity may utilize the transceiver 410 and multiplexing circuit 440 to transmit grant-less traffic and grant-based traffic based on the first probability and second probability. The grant-less traffic and grant-based traffic may be multiplexed using TDM and/or FDM in a slot. Therefore, the number of UEs that can transmit grant-less traffic or gain grant-less access in a slot can be controlled based on probabilities determined based on the loading control indicators.

Of course, in the above examples, the circuitry included in the processor 304 or 404 is merely provided as an example, and other means for carrying out the described functions may be included within various aspects of the present disclosure, including but not limited to the instructions stored in the computer-readable storage medium 306 or 406, or any other suitable apparatus or means described in any one of the FIGS. 1 and/or 2, and utilizing, for example, the processes and/or algorithms described herein in relation to FIGS. 5-15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as 5G New Radio (NR), Long-Term Evolution (LTE), the Evolved Packet System (EPS), and/or the Universal Mobile Telecommunication System (UMTS). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduling entity, the method comprising:
communicating with a plurality of user equipments (UEs) utilizing a plurality of slots configured to multiplex grant-based traffic and grant-less traffic in a same cell;
determining intra-cell interference to the grant-based traffic caused by the grant-less traffic in the same cell; and
transmitting control information to the plurality of UEs, to mitigate the intra-cell interference by statistically controlling a number of the plurality of UEs that transmit the grant-less traffic in one or more of the plurality of slots, the grant-less traffic comprising on-going grant-less traffic currently being transmitted by the number of the plurality of UEs and pending grant-less traffic waiting to be transmitted by the number of the plurality of UEs, the control information comprising a first indicator configured to statistically control the on-going grant-less traffic and a second indicator configured to statistically control the pending grant-less traffic.

2. The method of claim 1, wherein the control information further comprises:
a power control indicator configured to reduce transmission power of the grant-less traffic to one of a plurality of predetermined power fallback levels to mitigate the intra-cell interference.

3. The method of claim 1, wherein the transmitting further comprises:
broadcasting the control information in a downlink portion of one or more of the plurality of slots.

4. The method of claim 1, wherein the transmitting further comprises:
broadcasting the control information utilizing a semi-static configuration.

5. The method of claim 1, wherein the plurality of slots multiplex the grant-less traffic and the grant-based traffic using at least one of time division multiplexing or frequency division multiplexing.

6. The method of claim 1, wherein the transmitting comprises at least one of:
broadcasting the control information in a downlink portion of each slot of the plurality of slots, to indicate one or more of the plurality of slots being reserved for the grant-less traffic and one or more of the plurality of slots being reserved for the grant-based traffic; or
broadcasting semi-static configuration comprising the control information to indicate one or more of the plurality of slots being reserved for the grant-less traffic and one or more of the plurality of slots being reserved for the grant-based traffic.

7. The method of claim 1, wherein the determining intra-cell interference comprises:
receiving a reference signal from the plurality of UEs that transmit the grant-based traffic; and
determining whether a signal quality of the reference signal is less than a predetermined threshold.

8. The method of claim 1, further comprising receiving the grant-less traffic in a physical uplink shared channel.

9. The method of claim 1, wherein the first indicator and the second indicator are configured to control the number of the plurality of UEs that transmit the grant-less traffic in a same slot.

10. A method of wireless communication operable at a user equipment, the method comprising:
communicating with a scheduling entity utilizing a plurality of slots configured to multiplex grant-based traffic and grant-less traffic in a same cell;
receiving control information from the scheduling entity for mitigating intra-cell interference between the grant-based traffic and the grant-less traffic in the same cell, the grant-less traffic comprising on-going grant-less traffic currently being transmitted by the user equipment and pending grant-less traffic waiting to be transmitted by the user equipment, the control information comprising a first indicator configured to statistically control the on-going grant-less traffic and a second indicator configured to statistically control the pending grant-less traffic;
determining a first probability of transmitting the grant-less traffic in one or more of the plurality of slots based on the control information;
determining a second probability of transmitting the grant-based traffic in one or more of the plurality of slots based on the control information; and
transmitting, in the same cell, the grant-less traffic and the grant-based traffic based on the first probability and the second probability.

11. The method of claim 10, wherein the control information further comprises:
a power control indicator configured to reduce transmission power of the grant-less traffic to one of a plurality of predetermined power fallback levels to mitigate the intra-cell interference.

12. The method of claim 10, wherein the receiving comprises at least one of:
receiving the control information in a downlink portion of each slot of the plurality of slots; or
receiving a semi-static configuration comprising the control information.

13. The method of claim 10, wherein the plurality of slots multiplex the grant-less traffic and the grant-based traffic using at least one of time division multiplexing or frequency division multiplexing.

14. The method of claim 10, wherein the transmitting comprises transmitting the grant-less traffic in a physical uplink shared channel.

15. A wireless communication apparatus comprising:
a communication interface configured to communicate with a plurality of user equipments (UEs);
a memory; and
a processor operatively coupled to the memory and the communication interface,
wherein the memory and the processor are configured to:
communicate with the plurality of UEs utilizing a plurality of slots configured to multiplex grant-based traffic and grant-less traffic in a same cell;
determine intra-cell interference to the grant-based traffic caused by the grant-less traffic in the same cell; and
transmit control information to the plurality of UEs, to mitigate the intra-cell interference by statistically controlling a number of the plurality of UEs that transmit the grant-less traffic in one or more of the plurality of slots, the grant-less traffic comprising on-going grant-less traffic currently being transmitted by the number of the plurality of UEs and pending grant-less traffic waiting to be transmitted by the number of the plurality of UEs, the control information comprising a first indicator configured to statistically control the on-going grant-less traffic and a second indicator configured to statistically control the pending grant-less traffic.

16. The apparatus of claim 15, wherein the control information further comprises
a power control indicator configured to reduce transmission power of the grant-less traffic to one of a plurality of predetermined power fallback levels to mitigate the intra-cell interference.

17. The apparatus of claim 15, wherein the processor is further configured to:
broadcast the control information in a downlink portion of one or more of the plurality of slots.

18. The apparatus of claim 15, wherein the processor is further configured to:
broadcast the control information utilizing a semi-static configuration.

19. The apparatus of claim 15, wherein the plurality of slots multiplex the grant-less traffic and the grant-based traffic using at least one of time division multiplexing or frequency division multiplexing.

20. The apparatus of claim 15, wherein the processor is further configured to at least one of:
broadcast the control information in a downlink portion of each slot of the plurality of slots, to indicate one or more of the plurality of slots being reserved for the grant-less traffic and one or more of the plurality of slots being reserved for the grant-based traffic; or
broadcast semi-static configuration comprising the control information to indicate one or more of the plurality of slots being reserved for the grant-less traffic and one or more of the plurality of slots being reserved for the grant-based traffic.

21. The apparatus of claim 15, wherein the processor is further configured to:
receive a reference signal from the plurality of UEs that transmit the grant-based traffic; and
determine whether a signal quality of the reference signal is less than a predetermined threshold.

22. The apparatus of claim 15, wherein the processor is further configured to receive the grant-less traffic in a physical uplink shared channel.

23. The apparatus of claim 15, wherein the first indicator and the second indicator are configured to control the number of the plurality of UEs that transmit the grant-less traffic in a same slot.

24. A wireless communication apparatus comprising:
a communication interface configured to communicate with a scheduling entity;
a memory; and
a processor operatively coupled to the memory and the communication interface,
wherein the memory and the processor are configured to:
communicate with the scheduling entity utilizing a plurality of slots configured to multiplex grant-based traffic and grant-less traffic in a same cell;
receive control information from the scheduling entity for mitigating intra-cell interference between the grant-based traffic and the grant-less traffic in the same cell, the grant-less traffic comprising on-going grant-less traffic currently being transmitted by the wireless communication apparatus and pending grant-less traffic waiting to be transmitted by the wireless communication apparatus, the control information comprising a first indicator configured to statistically control the on-going grant-less traffic and a second indicator configured to statistically control the pending grant-less traffic;
determine a first probability of transmitting the grant-less traffic in one or more of the plurality of slots based on the control information;
determine a second probability of transmitting the grant-based traffic in one or more of the plurality of slots based on the control information; and
transmit, in the same cell, the grant-less traffic and the grant-based traffic based on the first probability and the second probability.

25. The apparatus of claim 24, wherein the control information further comprises:
a power control indicator configured to reduce transmission power of the grant-less traffic to one of a plurality of predetermined power fallback levels to mitigate the intra-cell interference.

26. The apparatus of claim 24, wherein the processor is further configured to at least one of:
receive the control information in a downlink portion of each slot of the plurality of slots; or
receive a semi-static configuration comprising the control information.

27. The apparatus of claim 24, wherein the plurality of slots multiplex the grant-less traffic and the grant-based traffic using at least one of time division multiplexing or frequency division multiplexing.

28. The apparatus of claim 24, wherein the processor is further configured to transmit the grant-less traffic in a physical uplink shared channel.

* * * * *